United States Patent Office 2,780,249
Patented Feb. 5, 1957

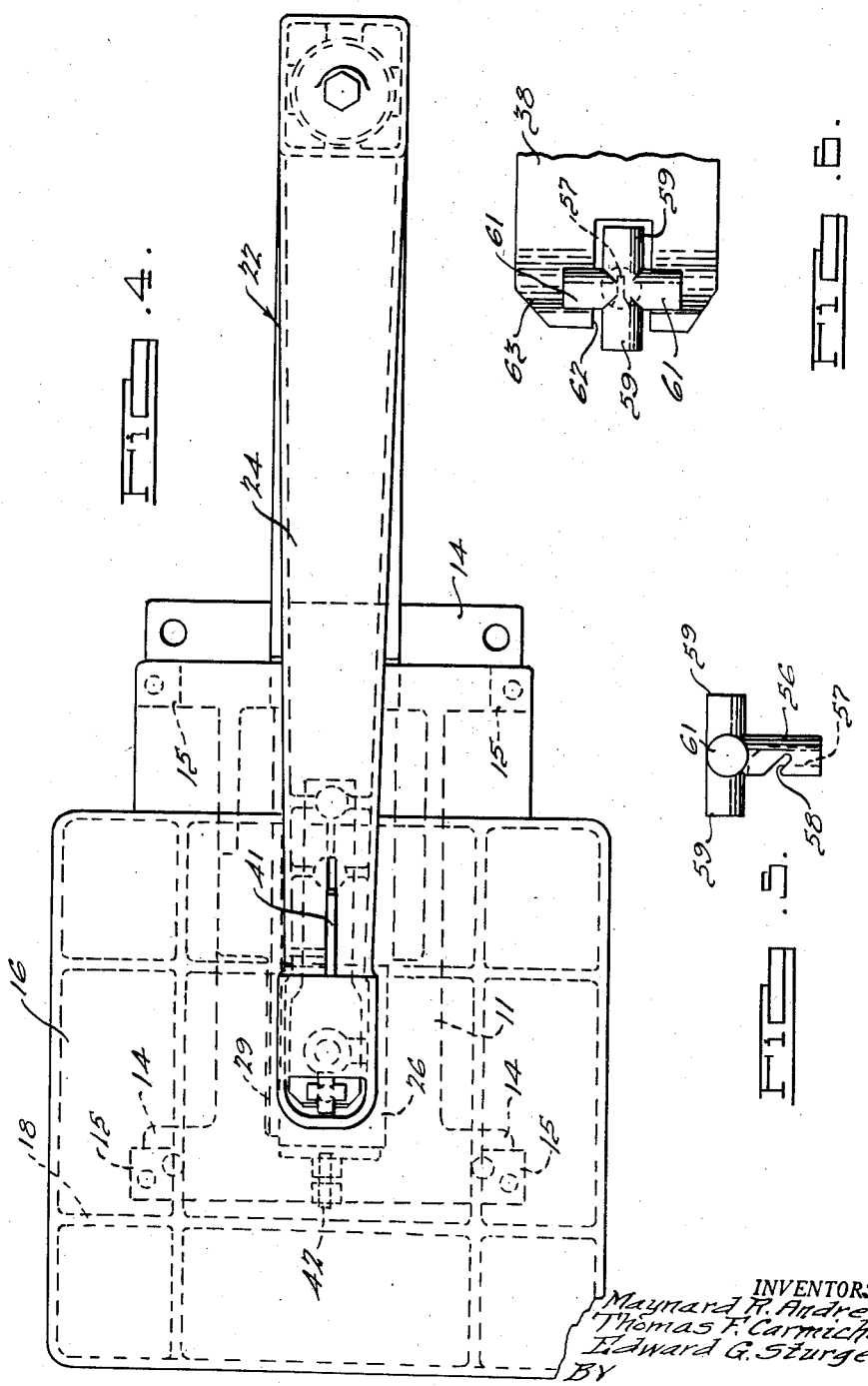

2,780,249

TABLE JIGSAW WITH TILTABLE BLADE

Maynard Rudolph Andreae, Bloomfield Hills, Thomas F. Carmichael, Plymouth, and Edward G. Sturgeon, Berkley, Mich., assignors to Syncro Corporation, Oxford, Mich., a corporation of Michigan Application October 20, 1954, Serial No. 463,476

1 Claim. (Cl. 143—78)

This invention relates to jigsaws, and more particularly to saws of the bench type having a table for supporting the work.

It is an object of the present invention to provide an improved jigsaw construction utilizing a vibratory electric motor, which incorporates means for easily and accurately adjusting the angular position of the saw blade with respect to the work.

It is another object to provide an improved jigsaw of the above type, in which the driving means is movably mounted with respect to the table and has a simple and efficient connection with the saw blade.

It is a further object to provide an improved jigsaw having the above characteristics, which is of compact construction and affords ready access to the driving mechanism.

It is also an object to provide a jigsaw of the above nature in which novel means are provided for holding the saw blade so that it may be turned axially to cutting positions 90° apart.

Other objects, features, and advantages of the present invention will become apparent from the subsequent description, taken in conjunction with the accompanying drawings.

In the drawings:

Figure 4 is a top plan view of the jigsaw, showing the shape of the base and motor housing, in addition to the cooperation between the blade holder and upper leaf spring;

Figure 5 is a detailed elevational view of the upper blade holder; and

Figure 6 is a top plan view of the upper blade holder, showing the shape of the retaining head.

Figure 1:
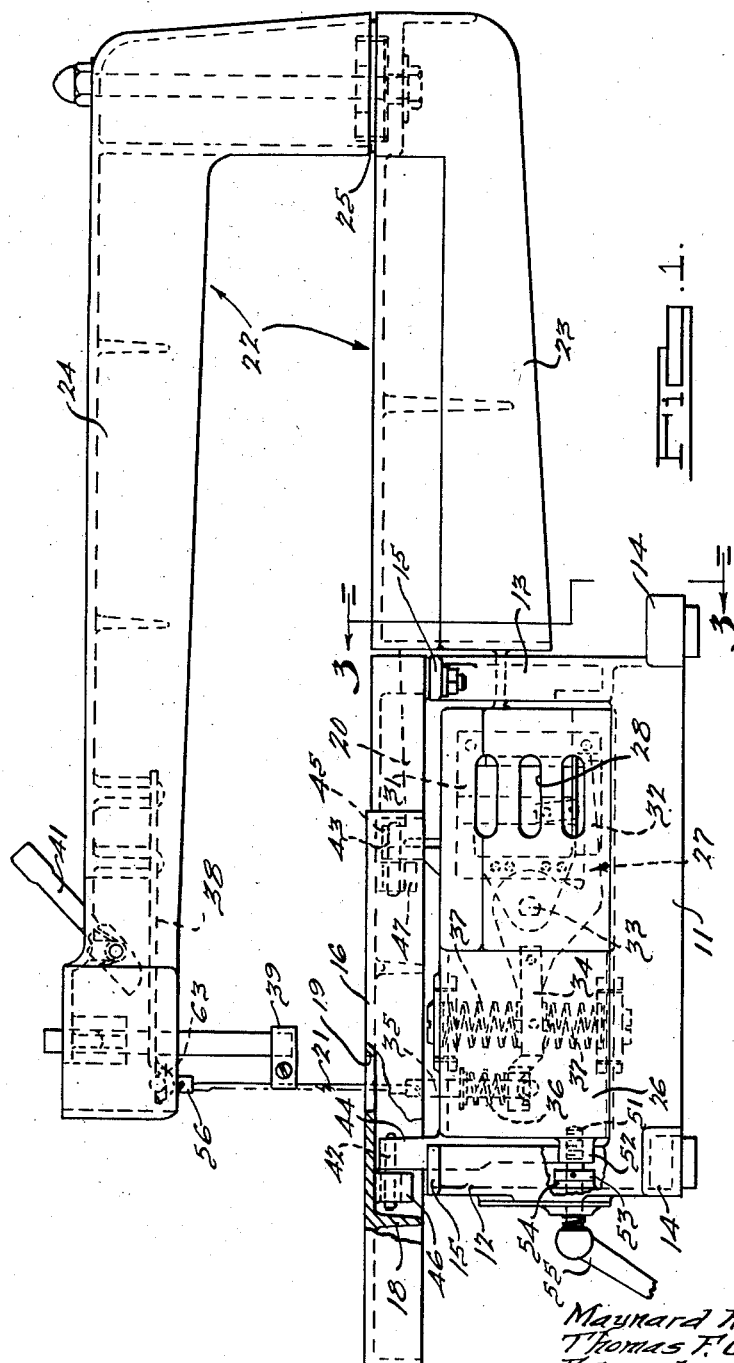
Figure 1 is a side elevational view of the jigsaw of this invention, showing the configuration of the parts and the pivotal supporting means for the motor housing and blade supporting frame.
Figure 2:
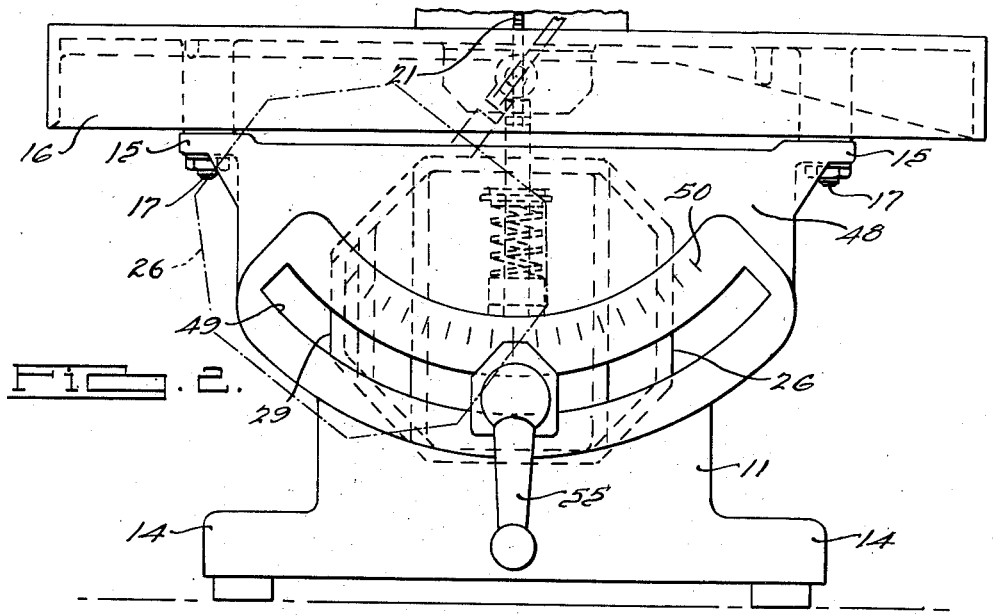
Figure 2 is a front elevational view of the base and table, showing the disposition of the motor housing within the base and the angular adjustment slot.
Figure 3:
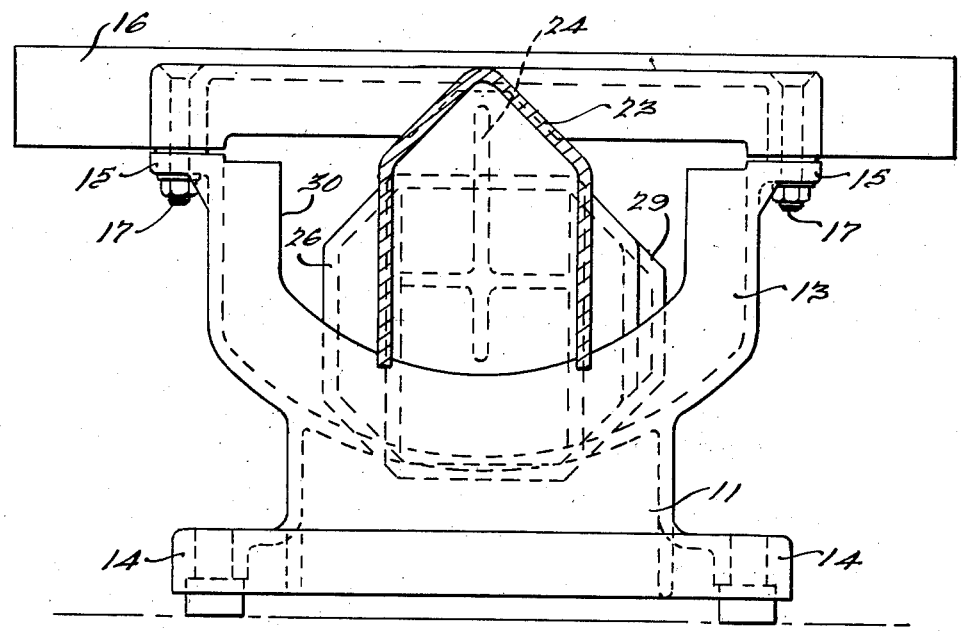
Figure 3 is an elevational view in cross section taken along the line 3—3 of Figure 1 and showing the cross-sectional shape of the lower portion of the blade supporting frame as well as the form of the base.

The improved jigsaw of this invention comprises a base 11 which is generally U-shaped as shown in Figure 1, having a forward upright portion 12 and a rear upright portion 13. Base 11 is provided with feet 14 at the corners thereof, and uprights 12 and 13 carry spaced pads 15 upon which rests a table 16. As seen in Figures 2 and 3, bolts 17 serve to secure table 16 to the base, and a plurality of ribs 18 may be formed on the underside of the table for strengthening purposes.

A clearance aperture 19 is provided in table 16 for the reception of a saw blade 21. The saw blade is carried by a supporting frame generally indicated at 22, this frame being of C- or oxbow shape. Frame 22 comprises a lower section 23 and an upper section 24, the sections being joined at 25 and secured together by a bolt.

Lower section 25 of frame 22 is of channel-shaped cross section as shown in Figure 3, and has an extension 20 which extends forwardly through a recess 30 in upright 13. Extension 20 carries a motor housing 26 which may be formed integrally therewith and is disposed within the space provided between base 11 and table 16. Housing 26 serves to support and enclose a vibratory electric motor generally indicated at 27 in Figure 1, and also encloses the connection between this motor and saw blade 21. The housing may be provided with vent openings as shown at 28, and a removable cover 29 is secured to one side of the housing as seen in Figure 3.

The driving motor and its attendant parts, which in themselves do not form part of the present invention, comprise an E-shaped core 31 carrying a coil, and a movable armature 32. The armature is pivotally mounted at 33 for movement about a horizontal axis, and has an extension 34 at its forward end. Blade 21 is secured at its lower end to extension 34 by means of a lower blade holder 35, a spring 36 retaining holder 35 in position. The motor is also provided with compression springs 37 disposed between extension 34 and the upper end lower walls of housing 26.

The functioning of a vibratory motor of this type is described in detail in copending application Serial No. 335,902, filed February 9, 1953, and assigned to the assignee of the present application. For purposes of this description, it need only be stated that vibration of armature 32 will cause reciprocal movement of extension 34, thereby vibrating saw blade 21. The upper end of blade 21 is resiliently supported by a leaf spring 38 which is secured within upper section 24 of frame 22. A guide 39 for the saw blade and a release lever 41 for spring 38 are also carried by frame section 24.

Means are provided for adjusting the angle of saw blade 21 with respect to the surface of table 16. This means comprises a pivotal support for frame 22 and housing 26 which permits these parts to be swung about a horizontal axis extending in a fore-and-aft direction. In the present embodiment, the pivotal support comprises a pair of pivot pins 42 and 43 which are fixed to upwardly extending lugs 44 and 45 respectively on housing 26. These pins are rotatably supported by bearings 46 and 47 on the underside of table 16 which is fixed to base 11. The common axis of pins 42 and 43 is relatively close to the table surface and is close to the center of gravity of the swingable assembly comprising frame 22, housing 26 and motor 27. It will be noted that the open-sided construction of base 11 is such that free swinging movement of housing 26 is permitted through a relatively large angularity, as shown in dot-dash lines in Figure 2. Moreover, the location of the pivot axis close to the surface of table 16 makes necessary a relatively small diameter for clearance aperture 19, since the movement of that portion of saw blade 21 which passes through table 16 is not great.

Means are also provided for clamping the swingable assembly in its adjusted angular position. In the preferred embodiment, a front plate 48 (Figure 2) is provided on base 11, and an arcuate slot 49 is formed in plate 48 which has a calibrated scale 50 adjacent the slot. A clamping screw 51 (Figure 1) extends through this arcuate slot and is threadably mounted in the front wall of housing 26 by means of a boss 52. A collar 53 is fixed to screw 51 and engages a boss 54 on front plate 48. A handle 55 is mounted on the forward end of screw 51, so that turning of the screw will clamp collar 53 against a boss 54 at any angular position of the swingable assembly.

Means are also provided for holding saw blade 21 in cutting planes either parallel to or at right angles to the longitudinal axis of the jigsaw. This means comprises a novel connection between the upper and lower saw blade holders and their respective supports. The drawings show the details of this novel connection with respect to the upper blade holder 56 which is supported by leaf spring 38. It will be understood however, that the same principles of construction are used for the connecting means between lower blade holder 35 and armature extension 34. As shown in Figures 5 and 6, the shank portion of blade holder 56 is provided with the conventional longitudinal slot 57 and inclined transverse slot 58 for the reception of the blade end and attaching pin. The head portion of blade holder 56 comprises four shoulders extending radially so as to form a pair of cylindrical cross pieces 59 and 61, the axes of which intersect at right angles. The forward end of leaf spring 38 has an open-ended slot 62 for the reception of the shank of blade holder 56. Spring 38 is also provided with a semicircular depression or recess 63 adjacent slot 62 for the reception of either pair of shoulders 59 or 61. The length of slot 62 is sufficient to accommodate the shoulders not being held in depression 63. Armature extension 34 is likewise provided with a slot and depressed portion for the retention of the head of blade holder 35. It will therefore be seen that the teeth of saw blade 21 may be held in any of four positions 90° apart depending on the positioning of shoulders 59 and 61. This adjustment may be made quickly and easily, merely by lifting the blade holders from their respective supports and replacing them in the proper position.

In operation of the jigsaw, the blade holders 35 and 56 are first properly positioned on their respective supports. Clamping collar 53 is loosened by means of handle 55, and the swingable assembly, comprising blade supporting frame 22 and motor housing 26 is pivoted about the common axis of pivot pins 42 and 43. When the proper angularity has been chosen, as shown on scale 50, the swingable assembly is clamped in position by means of clamping screw 51. Vibratory motor 27 is energized, and the reciprocating movements of armature extension 34 will vibrate saw blade 21, the latter being resiliently supported at its upper end by spring 38.

It will be noted that the construction of the jigsaw is such that a quick and easy angular blade adjustment is possible, and that work table 16 is at all times in a horizontal position for convenient handling of the work. The assembly is quite compact in nature with the driving elements being disposed within base 11 and below table 16, thus being out of the way but readily accessible for maintenance purposes.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

What is claimed:

In a table jigsaw, a base having a lower horizontal portion, a forward upright portion and a rear upright portion, the rear upright portion being yoke-shaped to provide an upwardly facing central recess, a pair of pads at the opposite side corners of the tops of each of said uprights, a table secured to said pads, a clearance aperture in said table, a C-shaped frame adapted to support the upper end of a saw blade which extends through said clearance aperture, an extension on the lower end of said C-shaped frame extending through said recess, a motor housing carried by said extension within the space provided between said table and the lower portion of said base, a vibratory motor disposed within said housing, a connection between said motor and the lower end of said blade, a pair of pivot pins at the forward and rear ends of said housing, a pair of bearings on the underside of said table for supporting said pins, whereby said frame and housing may be swung through a relatively large angularity, an arcuate slot in the forward upright portion of said base, a clamping screw mounted in the forward portion of said housing and extending through said slot, and a handle mounted on said screw whereby said frame and housing may be clamped in its adjusted angular position.

References Cited in the file of this patent
UNITED STATES PATENTS

| | | |
|---|---|---|
| 46,106 | Hoffman | Jan. 31, 1865 |
| 83,362 | Chamberlin | Oct. 27, 1868 |
| 598,362 | Connelly | Feb. 1, 1898 |
| 1,856,740 | Anderson | May 3, 1932 |
| 2,101,362 | Davidson | Dec. 7, 1937 |
| 2,233,862 | Dremel | Mar. 4, 1941 |
| 2,292,872 | Eastman | Aug. 11, 1942 |
| 2,613,700 | Hoffman et al. | Oct. 14, 1952 |
| 2,652,863 | Grabinski | Sept. 22, 1953 |
| 2,725,905 | Plulera | Dec. 6, 1955 |